United States Patent [19]

Kipp

[11] 4,206,793

[45] Jun. 10, 1980

[54] PROCESS FOR IMPROVING THE IMPREGNABILITY OF WOOD

[75] Inventor: Thorwald Kipp, Bad Oeynhausen, Fed. Rep. of Germany

[73] Assignee: Eisenwerk Weserhütte AG, Fed. Rep. of Germany

[21] Appl. No.: 891,851

[22] Filed: Mar. 30, 1978

[30] Foreign Application Priority Data

Mar. 30, 1977 [DE] Fed. Rep. of Germany ....... 2714010

[51] Int. Cl.[2] .............................................. B23B 39/16

[52] U.S. Cl. ...................................... 144/325; 408/42; 408/53; 427/291

[58] Field of Search ........................... 408/42, 53, 204; 144/2 R, 2 J, 2 K, 92, 93, 309 R, 320, 321, 325; 427/444, 291; 21/73

[56] References Cited

U.S. PATENT DOCUMENTS 1,012,207 12/1911 Kolossvary .......................... 427/291

FOREIGN PATENT DOCUMENTS 280110 6/1911 Austria .................................... 427/291

*Primary Examiner*—Robert Louis Spruill
*Assistant Examiner*—W. D. Bray
*Attorney, Agent, or Firm*—James E. Bryan

[57] ABSTRACT

This invention relates to an improvement in the process for improving the impregnability of wood which is pierced on its surface prior to an impregnation procedure by means of solid, circular needles which are guided essentially perpendicularly to said wood surface, without thereby causing chipping or splintering, the improvement comprising using sharp, circular needles with smooth surfaces, rotating about their central axes, and at an essentially constant ratio of the peripheral speed (u) of these needles to their speed of advance (v) with which they drive into the wood.

2 Claims, No Drawings

PROCESS FOR IMPROVING THE IMPREGNABILITY OF WOOD

The present invention relates to a process for improving the impregnability of wood, which process employs solid needles guided essentially perpendicularly to the surface of the wood to punch impregnating holes into the surface area of the wood, without creating chips and prior to the impregnation.

It is known how to obtain the impregnating orifices using solid or hollow needles or borers in an appropriate distribution and to feed the impregnating material under pressure into the wood during or immediately after the withdrawal of the needles or borers, i.e., into the holes so created, with the guides for the needles or borers being pressed so firmly against the wood that escaping of the impregnating material between the guides and the wood is prevented.

Such so-called vaccination processes inherently include the impregnation procedure. The supply of the impregnating material to the individual needles requires high equipment expenditures and the driving force for the needles is appreciable, particularly where hollow needles of large diameters are concerned. It has been proposed therefore to rotate the hollow needles while they are being driven into the wood, but this results in splintering or chipping of the fibers of the wood, and the strength of the wood is significantly and decisively weakened thereby.

On the other hand, the invention relates to those processes for achieving impregnating orifices which are free from splintering or chipping, and which offer the advantage of being independent of the subsequent impregnating process, so that this impregnating process can be selectively carried out using the equipment of known industrial techniques and furthermore also by artisanal means, for instance coating, spraying, dipping or the like. Such processes are known as incising processes. The impregnating orifices are achieved by punching solid needles into the wood, where the needles are either circular in cross-section or are ground like chisels or knives in the direction of the wood fibers, so that the term "knives" is used for the ground type of needles.

The incising process using knives mounted on compression rollers has demonstrated its worth in practice, even though not entirely free of chipping or splintering, and even though the tearing off of chips almost inevitably damages the surface of the wood.

The alternatively possible incising process using round needles at no time has achieved practical significance. Even though incising by means of slender, solid needles guided essentially perpendicularly to the surface of the wood results in impregnating orifices in the wood which are completely free of chips or splinters, and without there being any significant weakening of the mechanical strength of the wood—the slender needles merely pushing the wood fibers aside—, it is known that a considerably larger force must be applied for the incising by circular needles than for knives of the same cross-sectional area (this area being a measure of the input surface for the impregnating material obtained from the impregnation boring). Again it is known that the impregnating orifices obtained by using slender, circular needles contract again because of the elasticity of the displaced wood fibers at an excessively rapid rate, whereby the accessibility provide by the impregnation orifices is reduced, so that the basic advantage of this process, namely being an impregnation process independent as regards time from the incising process, cannot be optimally exploited.

Nevertheless, the present invention improves the incising process that uses solid, circular needles so that it becomes economically practical and the advantage of the completely chipless and splinterless incising of impregnation orifices, which do not affect the mechanical strength of the wood, remain.

This problem is solved by the invention by rotating sharp, circular needles with smooth surfaces about their central axes and by piercing them into the wood at an essentially constant ratio of peripheral speed to speed of advance. Preferably the ratio of the needle peripheral speed $\mu$, which is measured at the cylindrical part of the needles, and the speed of advance v of the needles, will be between 2 and 4.

The process of the invention permits piercing impregnation orifices into the wood without creating splinters or chips and requiring only extremely low driving forces, futhermore achieving that the cited impregnation orifices do not significantly tend to contract and do retain their impregnating accessibility even after long periods of storage.

The sufficient extremely low forces needed for driving the rotating needles are much less than those required for driving knives of the same cross-section, and thereby is provided for the first time the essential condition for industrially economical incising using solid, circular needles. Hence a plurality of needles may be driven into the wood, without thereby requiring excessive drive power which could be obtained only by costly equipment.

The advantages of the process of the invention primarily derive from the essentially constant u/v ratio of the needles. The peripheral speed $\mu$is obtained from the angular speed and from the needle diameter. This peripheral speed and the clamping force of the wood together with the friction factor (coefficient of friction) between the smooth needle surface and the wood determine the frictional work, which according to the invention should result only in a limited temperature rise of the needles. The heating of the needles is limited by their heat conducting cross-section, i.e., by their diameters, and by the cooling of the needles corresponding to the needle advance in the wood.

All parameters must be harmonized by a given and essentially constant u/v ratio (preferably between 2 and 4), in order to achieve those effects required for an economical implementation of the process of the invention, namely to obtain a decisive reduction of the driving force required to force the needles into the wood and furthermore to ensure long-duration accessibility in the impregnation orifices.

The accessibility of the impregnation orifices is achieved by the limited rise in temperature of the needles when they are driven into the wood. Rising temperatures lessen the compressive strength of the wood which assumes more or less pronounced plastic properties while the temperatures are raised. This effect both facilitates the driving of the needles and prevents the impregnation orifices from closing again in the solidified (cooled) condition of the plastically deformed parts of the wood, so that wood punched according to the process of the invention will retain good impregnation orifice accessibility even after long storage.

The u/v ratio of the invention also determines the temperature rise in the needles within the required limits. Excessive temperature results in burning, i.e., destruction of the pertinent wood fibers, with combustion residues further being deposited on the needle surfaces and thereby correspondingly increasing the friction between the wood and the needles.

Because the peripheral speed in conjunction with the clamping force of the woòd driven open and further with the coefficient of friction between needle surface and wood, depending on the peripheral speed, simultaneously affects the frictional work and hence the heating of the needles, in an advantageous embodiment of the process of the invention needles are employed with diameters between 0.5 and 1.5 mm and coated with nickel or chromium, preferably rotating wth angular speeds exceeding 3,000 rpm. Observing the preferred u/v ratio between 2 and 4, advance speeds are obtained which optimize the economic implementation of the process of the invention, in which a larger u/v ratio is recommended when the needle diameter is small and the piercing depth is shallow. In contrast, a small u/v ratio should be selected for great piercing depths or thicker needles or for treating especialy a hard wood.

The process of the invention is suitable for all kinds of wood, in particular also for those kinds difficult to impregnate such as spruce, Douglas fir, oak, and the like, further for natural-state grown trunks or cut timber, with surfaces predominantly of impregnation-resistant heartwood. All known impregnation processes are suitable for the ensuing impregnation, in particular also the artisanal methods already mentioned.

It will be obvious to those skilled in the art that many modifications may be made within the scope of the present invention without departing from the spirit thereof, and the invention includes all such modifications.

What is claimed is:

1. In the process for improving the impregnability of wood by forming impregnation orifices therein prior to an impregnation procedure by means of solid, sharp, circular needles with smooth surfaces, rotating about their central axes, and which are guided essentially perpendicularly to the surface of the wood, without thereby causing chipping or spintering, the improvement which comprises harmonizing and maintaining an essentially constant ratio of the peripheral speed of the needles to the speed of advance with which they drive into the wood, said ratio being between the values of 2 and 4, whereby said impregnation orifices remain open in the cooled condition of the plastically deformed parts of the wood.

2. A process according to claim 1 including using nickel or chromium plated needles with diameters between 0.5 and 1.5 mm and rotating at angular speeds exceeding 3,000 rpm.

* * * * *